(12) United States Patent
McGuire et al.

(10) Patent No.: US 10,161,448 B2
(45) Date of Patent: Dec. 25, 2018

(54) RAILWAY TRUCK HAVING A SELF-LUBRICATING COMPOSITE BEARING PAD DISPOSED THEREIN

(71) Applicant: Roller Bearing Company of America, Inc., Oxford, CT (US)

(72) Inventors: Jarrod McGuire, Murrieta, CA (US); Matthew Porter, Huntington Beach, CA (US)

(73) Assignee: Roller Bearing Company of America, Inc., Oxford, CT (US)

(*) Notice: Subject to any disclaimer, the term of this patent is extended or adjusted under 35 U.S.C. 154(b) by 233 days.

(21) Appl. No.: 15/189,612

(22) Filed: Jun. 22, 2016

(65) Prior Publication Data

US 2016/0375915 A1     Dec. 29, 2016

Related U.S. Application Data

(60) Provisional application No. 62/183,339, filed on Jun. 23, 2015.

(51) Int. Cl.
    *F16C 29/02*      (2006.01)
    *F16C 33/20*      (2006.01)
    *B61F 5/32*      (2006.01)

(52) U.S. Cl.
CPC .............. *F16C 33/203* (2013.01); *B61F 5/32* (2013.01); *F16C 29/02* (2013.01); *F16C 2208/02* (2013.01); *F16C 2240/06* (2013.01); *F16C 2326/10* (2013.01)

(58) Field of Classification Search
CPC ...... B61F 5/26; B61F 5/28; B61F 5/30; B61F 17/00; B61F 17/02; B61F 17/14
See application file for complete search history.

(56) References Cited

U.S. PATENT DOCUMENTS

| | | | |
|---|---|---|---|
| 2,906,567 A * | 9/1959 | Runton | B61F 17/06 139/408 |
| 4,342,491 A | 8/1982 | Jamison et al. | |
| 4,575,145 A | 3/1986 | Wolfram et al. | |
| 5,288,354 A | 2/1994 | Harris et al. | |
| 5,664,890 A | 9/1997 | Nowak et al. | |
| 5,908,001 A | 6/1999 | Burke et al. | |
| 6,389,985 B1 | 5/2002 | Trent | |
| 6,792,874 B1 | 9/2004 | Anderson et al. | |
| 8,056,587 B2 | 11/2011 | Fuchs | |

(Continued)

FOREIGN PATENT DOCUMENTS

| | | |
|---|---|---|
| CN | 200971101 Y | 11/2007 |
| CN | 101880457 B | 10/2012 |

(Continued)

*Primary Examiner* — Robert J McCarry, Jr.
(74) *Attorney, Agent, or Firm* — Murtha Cullina LLP

(57) ABSTRACT

A railway truck assembly includes a self-lubricating pad disposed therein. The self-lubricating bearing pad includes a first layer. The first layer includes a plurality of self-lubricating fibers inter-woven with a plurality of support fibers. The self-lubricating bearing pad includes a plurality of fiber layers. Each of the plurality of fiber layers includes a plurality of support fibers. The self-lubricating bearing pad includes one or more matrix layers communicating with one or more of the plurality of fiber layers. One or more of the matrix layers are infused into one or more of the plurality of fiber layers.

7 Claims, 4 Drawing Sheets

(56) References Cited

U.S. PATENT DOCUMENTS

| | | |
|---|---|---|
| 8,931,957 B2 | 1/2015 | Hardgrave et al. |
| 9,156,059 B2 | 10/2015 | Soelch et al. |
| 2006/0062502 A1 | 3/2006 | Hupp |
| 2012/0294557 A1 | 11/2012 | Soelch et al. |
| 2013/0033013 A1 | 2/2013 | Voisine |

FOREIGN PATENT DOCUMENTS

| | | |
|---|---|---|
| JP | 2013108557 A | 6/2013 |
| KR | 101153175 B1 | 6/2012 |
| WO | 0056539 A1 | 9/2000 |

* cited by examiner

RAILWAY TRUCK HAVING A SELF-LUBRICATING COMPOSITE BEARING PAD DISPOSED THEREIN

CROSS REFERENCE TO RELATED APPLICATIONS

This patent application claims the benefit of U.S. Provisional Patent Application Ser. No. 62/183,339, filed on Jun. 23, 2015, which is hereby incorporated by reference in its entirety.

FIELD OF THE INVENTION

The present invention relates generally to a railway truck having a self-lubricating composite bearing pad disposed therein.

BACKGROUND OF THE INVENTION

Railway cars, such as tank and freight cars, typically include one or more railway truck assemblies that support one or more pairs of wheels on an axle. The railway truck assemblies include a frame that supports the axle via a bearing pad mounted in an axle mounting bracket. The railway cars are used in severe weather such as snow and ice and accumulate debris. As a result, ice and snow accumulate on the bearing pad, axles and wheels and deteriorate performance of the railway car. Accordingly, the railway cars are subject to de-icing and cleaning procedures that include spraying the railway car, the railway truck assemblies, wheels, axles and bearing pads with cleaning agents and de-icing agents. These cleaning agents and de-icing agents are corrosive. In addition, to thaw the ice and snow accumulated on the railway cars, the railway car, the railway truck assemblies, wheels, axles and/or bearing pads are heated to temperatures up to 350° F., for example, in a railway car ovens.

In order to survive the de-icing, cleaning and thawing operations and to support heavy loads imparted by materials contained in the railway cars, the bearing pads are typically made from a metallic material. However, such metallic bearing pads require a lubricant (e.g., grease) applied thereto to prevent premature wear and failure caused by operation of the railway cars at high speeds while carrying heavy loads and the resultant oscillatory movement between the bearing pads, the axle mounting bracket and the frame. However, the lubricant can become washed out during cleaning, de-icing and heating operations. If the bearing pad was not lubricated, high friction levels result in the inability of the railway car from being able to translate and can increase the propensity for the car to roll over. As a result, frequent maintenance is required to replenish the lubricant.

Attempts have been made to use a self-lubricating material for the bearing pad. However, such self-lubrication materials are generally polymer based and cannot withstand heating to 350° F. and tend to crush, creep, extrude or cold flow under high loads and high temperatures.

SUMMARY OF THE INVENTION

In one aspect, the present invention resides in a railway truck assembly that includes a frame defining one or more bearing receiving portions and an axle. The railway truck assembly includes a bearing assembly positioned between the one of the receiving portions and the axle. The bearing assembly is configured to allow movement between the axle and the frame. The bearing assembly includes a seat secured to the axle. The seat has a self-lubricating bearing pad secured thereto. The self-lubricating bearing pad is in sliding engagement with the one of the receiving portions of the frame. The self-lubricating bearing pad includes a slidable layer that includes a plurality of self-lubricating fibers inter-woven with a plurality of support fibers. The slidable layer has a sliding engagement surface and a first bonding surface opposite the sliding engagement surface. The self-lubricating bearing pad includes a first fiber layer that has a plurality of first support fibers. The self-lubricating bearing pad includes a second fiber layer comprising a plurality of second support fibers. The self-lubricating bearing pad includes a metallic substrate. The self-lubricating bearing pad includes a first matrix layer that has a polyester, an epoxy, a phenolic, a urethane, a polyimide and/or a polyamide therein. The first matrix layer is positioned between and at least partially infused into the slidable layer and the first fiber layer. The self-lubricating bearing pad includes a second matrix layer that has the polyester, the epoxy, the phenolic, the urethane, the polyimide and/or the polyamide therein. The second matrix layer is positioned between and at least partially infused into the first fiber layer and the second fiber layer. The self-lubricating bearing pad includes a third matrix layer that has the polyester, the epoxy, the phenolic, the urethane, the polyimide and/or the polyamide therein. The third matrix layer is positioned between the second fiber layer and the metallic substrate. The third matrix layer is at least partially infused into the second fiber layer and adhered to the metallic substrate. The self-lubricating bearing pad is configured to withstand temperatures of up to 350° F. and thereby maintain lubricating characteristics at temperatures up to 350° F. without melting, crushing, extruding or creeping.

In another aspect, the present invention resides in a self-lubricating bearing pad for a railway truck assembly includes a plurality of fiber layers (e.g., fabric fiber layers). Each of the plurality of fiber layers includes a plurality of self-lubricating fibers inter-woven with a plurality of support fibers. The self-lubricating bearing pad includes one or more matrix layers communicating with one or more of the plurality or fiber layers. One or more of the matrix layers are forced into one or more of the plurality or fiber layers.

In another aspect, the present invention resides in a railway truck assembly for a railway car such as a tanker or freight car. The railway truck assembly includes a frame defining one or more bearing receiving portions and an axle. The railway truck assembly includes a bearing assembly positioned between the at least one receiving portion and the axle. The bearing assembly is configured to allow movement between the axle and the frame. The bearing assembly includes a seat secured to the axle. The seat has a bearing pad secured thereto. The bearing pad is in sliding engagement with the one of the receiving portions of the frame. The bearing pad includes a plurality of fiber layers. Each of the plurality of fiber layers includes a plurality of self-lubricating fibers inter-woven with a plurality of support fibers. The self-lubricating bearing pad includes one or more matrix layers communicating with one or more of the plurality or fiber layers. One or more of the matrix layers are forced into one or more of the plurality or fiber layers.

DETAILED DESCRIPTION

Figure 1:
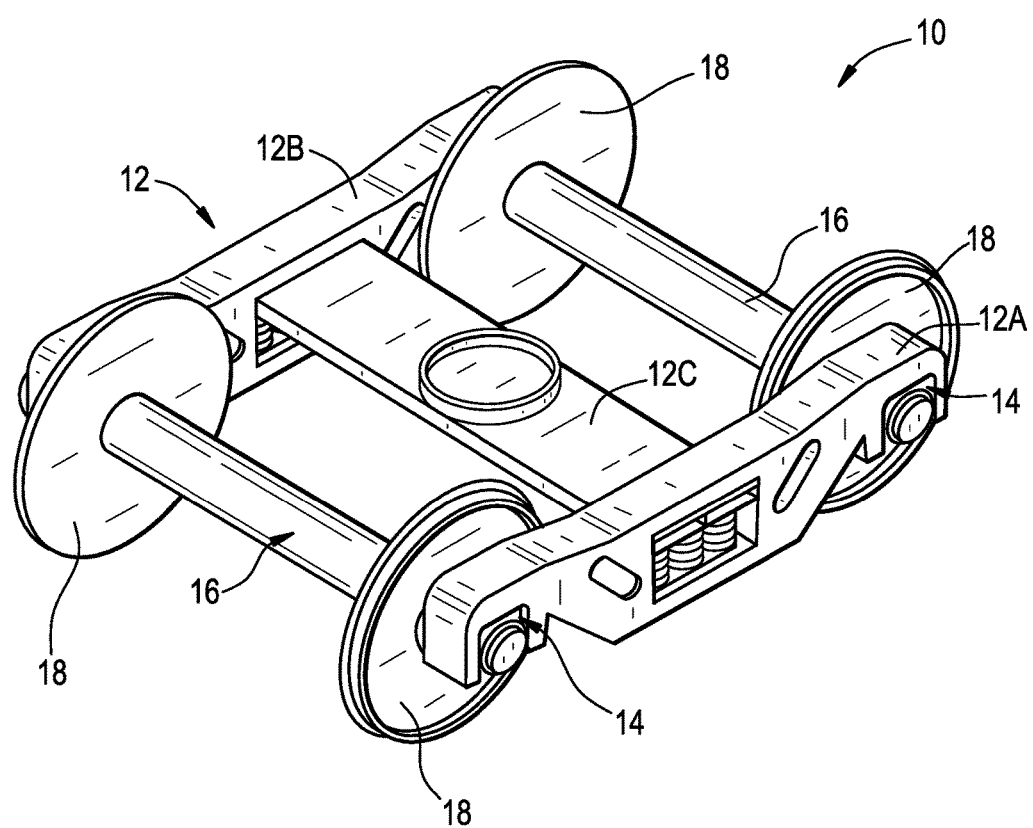
FIG. 1 is a perspective view of a railway truck assembly having the self-lubricating composite bearing pad therein.
Figure 2:
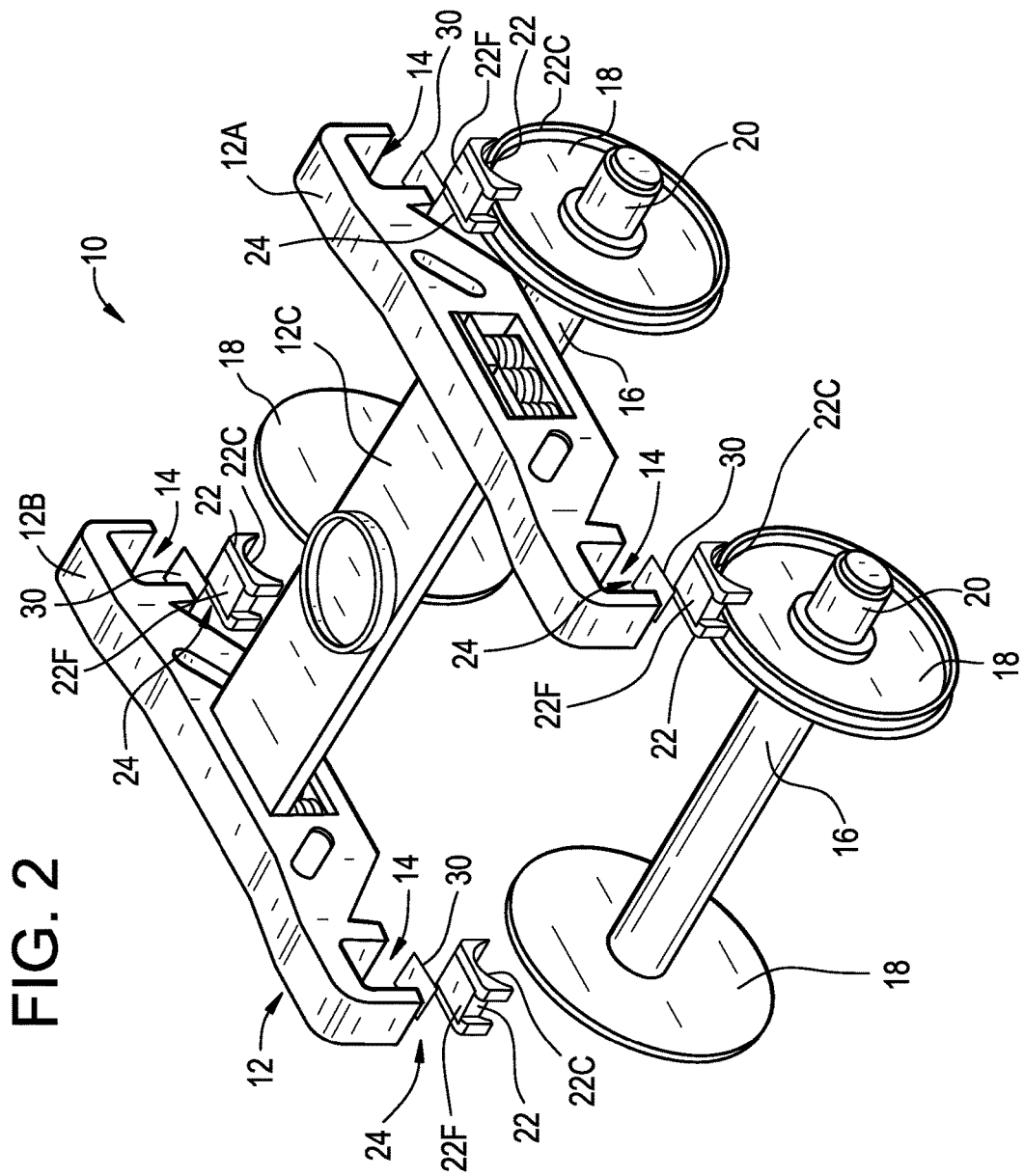
FIG. 2 is an exploded view of the railway truck assembly of FIG. 1.
Figure 3:
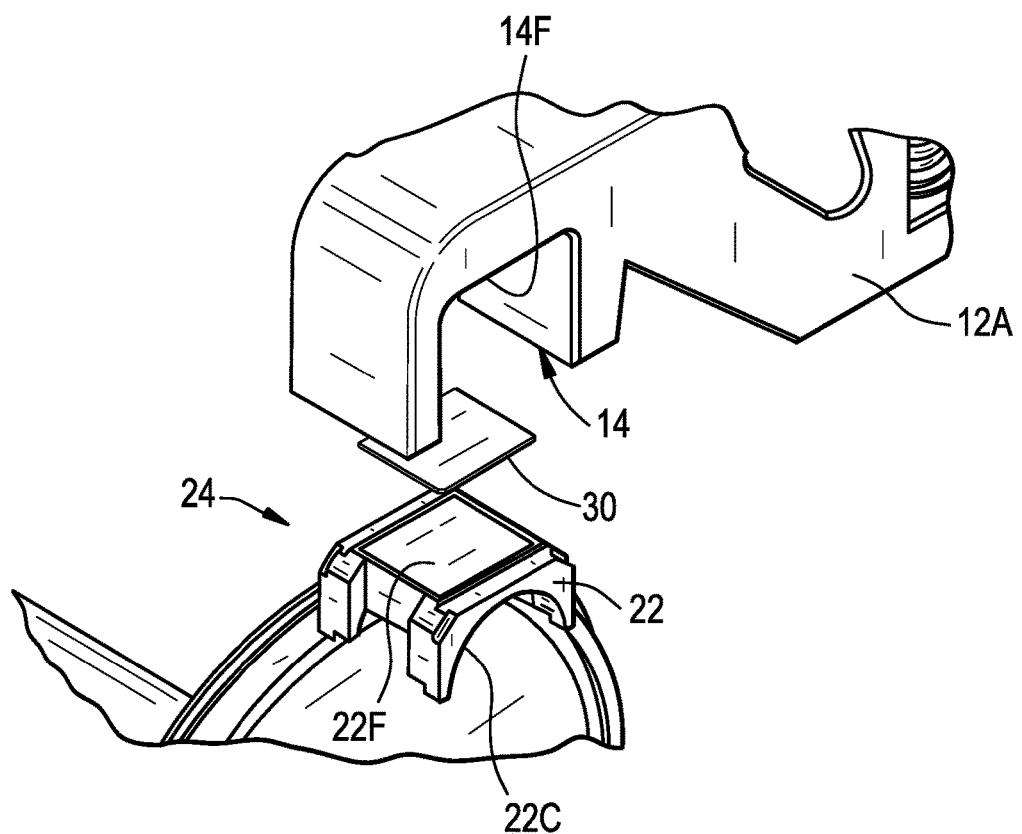
FIG. 3 is an enlarged view of a portion of the railway truck assembly of FIG. 2.

As shown in FIGS. 1-3 a railway truck assembly is generally designated by the numeral 10. The railway truck assembly 10 includes a frame 12. The frame 12 includes two side support members 12A and 12B coupled to one another by a connecting member 12C. The side support members 12A and 12B have two cup shaped bearing receiving portions 14 formed therein. While the frame is shown and described as having two side support members 12A and 12B coupled to one another by a connecting member 12C, the present invention is not limited in this regard as the frame may be of any configuration including any number of side support members and connecting members. Although the side support members 12A and 12B are shown and described as having two cup shaped bearing receiving portions 14, the present invention is not limited in this regard as the side support members 12A and 12B may have any number of bearing receiving portions of any configuration.

As shown in FIGS. 1 and 2, the railway truck assembly 10 includes two axles 16 having two rolling elements 18 (e.g., wheels) rotatingly journaled thereto, for example, using roller bearings (not shown). As shown in FIG. 2, each of the axles 16 includes a hub 20 configured to receive a bearing seat 22, for example a metal seat. A bearing assembly 24 is positioned between the receiving portion 14 and the hub 20 of the axle 16. The bearing assembly 24 is configured to allow movement (e.g., lateral and/or oscillatory movement required to prevent rollover of the rail car) between the hub 20 of the axle 16 and the frame 12. The bearing assembly 24 includes the bearing seat 22. The bearing seat 22 has a cup shaped portion 22C that is secured to the hub 20 of the axle 16 using suitable fasteners (not shown). The bearing seat 22 has a substantially flat surface 22F, which is recessed down creating a pocket for the bearing pad to rest and to resist any shear loads from sliding, opposing the cup shaped portion 22C. The flat surface is configured to receive a bearing pad 30 thereon. In one embodiment, the bearing pad 30 is secured to the flat surface 22F by a suitable adhesive. In one embodiment, the bearing pad 30 is molded to the flat surface 22F by a suitable molding process. The bearing pad 30 is in sliding engagement with a substantially flat surface 14F (shown in FIG. 3) of the receiving portion 14. In one embodiment, the bearing pad 30 is mechanically affixed and/or adhesively bonded to the flat surface 22F.

Figure 4:
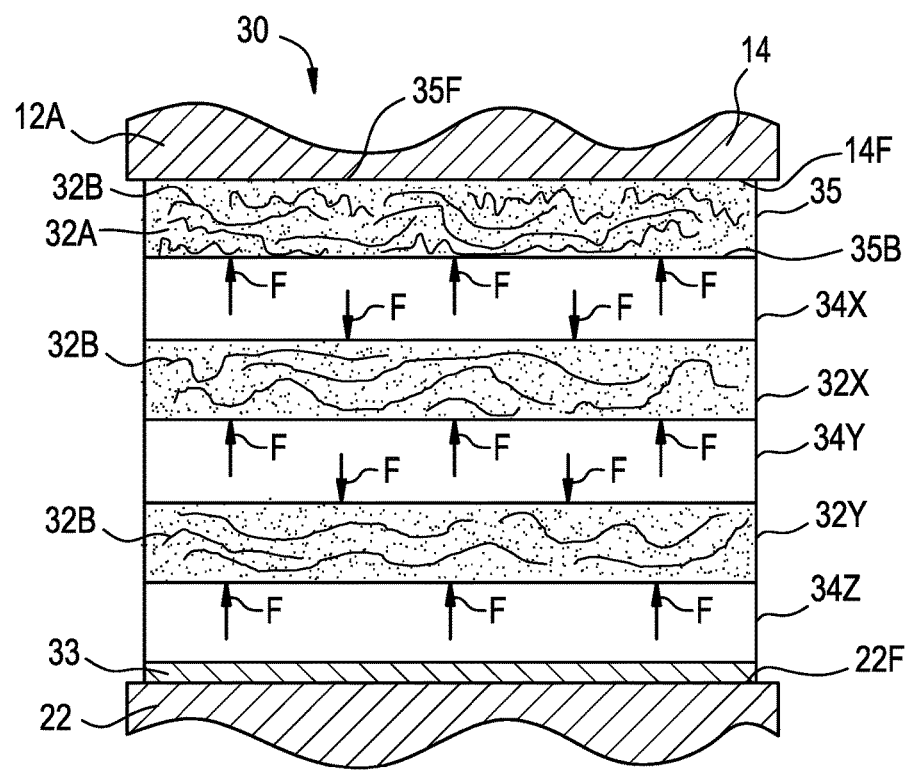
FIG. 4 is a cross sectional view of the self-lubricating bearing pad of FIGS. 1-3.

As shown in FIG. 4, the bearing pad 30 is manufactured from one or more of fiber (e.g., fabric) layers 32, for example, two fiber layers are shown. The bearing pad 30 includes one or more matrix layers 34 made from a resin. The matrix layers 34 communicate with the plurality of fiber layers 32. For example, a first matrix 34X layer is in communication with a first layer 35 that includes self-lubricating fiber 32A and support fiber 32B; and is in communication with a first fiber layer 32X that includes support fiber 32B. A second matrix 34Y layer is in communication with the first fiber layer 32X and with a second fiber layer 32Y that includes support fiber 32B. A third matrix 34Z layer is in communication with the second fiber layer 32Y and with the metal substrate 33. The metal substrate 33 is in communication with the bearing seat 22. A sliding engagement surface 35F of the first layer 35 is in sliding communication with the substantially flat surface 14F. The matrix layers 34 are forced into the plurality of fiber layers 32 and the first layer 35 as indicated by the arrows F so that the matrix layer 34 encapsulates the plurality or fiber layers 32. For example, the matrix layers 34 are forced into the plurality or fiber layers 32 by the application of pressure and heat. The bearing pad 30 is bonded to a suitable substrate, e.g., the metal substrate 33.

As shown in FIGS. 1-3 the railway truck assembly 10 includes the frame 12 defining the two bearing receiving portions 14 and the axle 16. The bearing assembly 24 is positioned between one of the receiving portions 14 and the axle 16. The bearing assembly 24 is configured to allow movement between the axle 16 and the frame 12. The bearing assembly 24 includes the seat 22 that is secured to the axle 16. The seat 22 has the self-lubricating bearing pad 30 secured thereto. The self-lubricating bearing pad 30 is in sliding engagement with the receiving portion 14 of the frame 12. The self-lubricating bearing pad 30 includes the slidable layer 35 that includes the plurality of self-lubricating fibers 32A inter-woven with the plurality of support fibers 32B. The slidable layer 35 has the sliding engagement surface 35F and a first bonding surface 35B opposite the sliding engagement surface 35F. The self-lubricating bearing pad 30 includes the first fiber layer 32X which has a plurality of the first support fibers 32B therein. The self-lubricating bearing pad 30 includes the second fiber layer 32Y that has a plurality of second support fibers 32B therein. The self-lubricating bearing pad 30 is adhered to the substantially flat surface 22F of the bearing seat 22, which is a metallic substrate. The self-lubricating bearing pad 30 includes the first matrix layer 34X that has a polyester, an epoxy, a phenolic, a urethane, a polyimide and/or a polyamide therein. The first matrix layer 34X is positioned between and at least partially infused into the slidable layer 35 and the first fiber layer 32X. The self-lubricating bearing pad 30 includes the second matrix layer 34Y that has the polyester, the epoxy, the phenolic, the urethane, the polyimide and/or the polyamide therein. The second matrix layer 34Y is positioned between and at least partially infused into the first fiber layer 32X and the second fiber layer 32Y. The self-lubricating bearing pad 30 includes the third matrix layer 34Z that has the polyester, the epoxy, the phenolic, the urethane, the polyimide and/or the polyamide therein. The third matrix layer 34Z is positioned between the second fiber layer 32Y and the substantially flat surface 22F of the bearing seat 22 (e.g., the metallic substrate). The third matrix layer 34Z is at least partially infused into the second fiber layer 32Y and adhered to the substantially flat surface 22F of the bearing seat 22 (e.g., the metallic substrate). The self-lubricating bearing pad 30 is configured to withstand temperatures of up to 350° F. and thereby maintain lubricating characteristics at temperatures up to 350° F. without melting, crushing, extruding or creeping.

In one embodiment, the plurality of self-lubricating fibers 32A are polytetrafluoroethylene (PTFE). In one embodiment, the plurality of support fibers 32B are fiberglass fibers, polyethylene terephthalate (Dacron®) fibers, polyester fibers, cotton fibers, meta-aramid (Nomex®) fibers and/or a para-aramid (Kevlar®) fibers. In one embodiment, the matrix layer includes polyester, epoxy, phenolic, urethane, polyimide and/or polyamide.

In one embodiment, the plurality of self-lubricating fibers 32A includes graphite fibers.

In one embodiment, bearing pad 30 includes a filler disposed therein, such as but not limited to fiberglass, graphite, bronze, molybdenum disulfide and carbon fiber. In one embodiment, the bearing pad 30 is comprised of a PTFE matrix and includes the filler disposed therein.

The bearing pad 30 is configured to withstand temperatures of up to and including 350° F. For example, the bearing pad 30 maintains lubricating characteristics at temperatures up to and including 350° F.

For example, the bearing pad 30 does not melt, crush, extrude or creep at temperatures up to and including 350° F. The bearing pad 30 is configured to withstand emerging, soaking or spraying with a corrosive cleaning agent without dissolving, distorting, melting, crushing, extruding or creeping. The bearing pad 30 is configured to withstand emerging, soaking or spraying with a corrosive cleaning agent and thereafter maintain lubricating characteristics. Additionally, the bearing pad 30 is configured to withstand frictional heat generated from sustained high frequency oscillatory motion under load.

Although the present invention has been disclosed and described with reference to certain embodiments thereof, it should be noted that other variations and modifications may be made, and it is intended that the following claims cover the variations and modifications within the true scope of the invention.

What is claimed is:

1. A railway truck assembly comprising:
   a frame defining at least one bearing receiving portion having a substantially flat surface;
   an axle having an axially extending hub, coaxial with the axle; and
   a bearing assembly positioned between the at least one bearing receiving portion and the axle, the bearing assembly being configured to allow lateral movement between the hub and the frame, to prevent roll over of the railway truck;
   the bearing assembly comprising:
      a seat securely fastened to the hub, the seat having a self-lubricating bearing pad secured thereto;
      the self-lubricating bearing pad being in lateral sliding engagement with the flat surface of the at least one bearing receiving portion of the frame; and
   the self-lubricating bearing pad comprising:
   a slidable layer comprising a plurality of self-lubricating fibers inter-woven with a plurality of support fibers, the slidable layer having a sliding engagement surface and a first bonding surface opposite the sliding engagement surface;
   a first fiber layer comprising a plurality of first support fibers;
   a second fiber layer comprising a plurality of second support fibers;
   a metallic substrate;
   a first matrix layer comprising at least one of a polyester, an epoxy, a phenolic, a urethane, a polyimide and a polyamide, the first matrix layer being positioned between and at least partially infused into the slidable layer and the first fiber layer;
   a second matrix layer comprising at least one of the polyester, the epoxy, the phenolic, the urethane, the polyimide and the polyamide, the second matrix layer being positioned between and at least partially infused into the first fiber layer and the second fiber layer;
   a third matrix layer comprising at least one of the polyester, the epoxy, the phenolic, the urethane, the polyimide and the polyamide, the third matrix layer being positioned between the second fiber layer and the metallic substrate, the third matrix layer being at least partially infused into the second fiber layer and adhered to the metallic substrate; and
   the self-lubricating bearing pad being configured to withstand temperatures of up to and including to 350° F. and thereby maintain lubricating characteristics at temperatures up to and including 350° F. without melting, crushing, extruding or creeping.

2. The railway truck assembly of claim 1, wherein the first matrix layer is infused into the slidable layer.

3. The railway truck assembly of claim 1, wherein the plurality of self-lubricating fibers comprises polytetrafluoroethylene (PTFE).

4. The railway truck assembly of claim 1, wherein the plurality of support fibers comprises at least one of fiberglass fibers, polyethylene terephthalate (Dacron®) fibers, polyester fibers, cotton fibers, meta-aramid (Nomex®) fibers and a para-aramid (Kevlar®) fibers.

5. The railway truck assembly of claim 1, wherein the plurality of self-lubricating fibers comprises graphite fibers.

6. The railway truck assembly of claim 1, further comprising a filler.

7. The railway truck assembly of claim 6, wherein the filler comprises at least one of fiberglass, graphite, bronze, molybdenum disulfide and carbon fiber.

* * * * *